United States Patent
Kamimura

(10) Patent No.: US 7,636,058 B2
(45) Date of Patent: Dec. 22, 2009

(54) PULSE SIGNAL TRANSMITTING APPARATUS, METHOD OF ADJUSTING WAVEFORM OF THE SAME, AND DME GROUND STATION APPARATUS

(75) Inventor: Yukihiro Kamimura, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 163 days.

(21) Appl. No.: 12/022,571

(22) Filed: Jan. 30, 2008

(65) Prior Publication Data

US 2008/0204303 A1  Aug. 28, 2008

(30) Foreign Application Priority Data

Feb. 2, 2007  (JP) ............... 2007-024555

(51) Int. Cl.
  *G01S 13/08* (2006.01)
  *G01S 13/84* (2006.01)
  *G01S 7/40* (2006.01)

(52) U.S. Cl. ............... 342/47; 342/82; 342/174

(58) Field of Classification Search ............ 342/47, 342/82–88, 173, 174
See application file for complete search history.

(56) References Cited

U.S. PATENT DOCUMENTS

| | | | | |
|---|---|---|---|---|
| 3,412,400 | A | * | 11/1968 | Aker ............... 342/48 |
| 3,997,898 | A | * | 12/1976 | LeGrand ............ 342/35 |
| 4,010,465 | A | * | 3/1977 | Dodington et al. ....... 342/35 |
| 4,218,679 | A | * | 8/1980 | Bohm et al. ........ 342/47 |
| 4,455,556 | A | * | 6/1984 | Koshio et al. ...... 342/47 |
| 4,518,964 | A | * | 5/1985 | Hetyei ............. 342/47 |
| 4,590,477 | A | * | 5/1986 | Regnier et al. ....... 342/173 |
| 4,968,968 | A |   | 11/1990 | Taylor |
| 5,101,211 | A |   | 3/1992 | DuFort |
| 2008/0204303 | A1 | * | 8/2008 | Kamimura ........ 342/47 |
| 2008/0297399 | A1 | * | 12/2008 | Kamimura ........ 342/47 |
| 2009/0033541 | A1 | * | 2/2009 | Kamimura ........ 342/47 |

FOREIGN PATENT DOCUMENTS

| | | |
|---|---|---|
| JP | 56-114774 | 9/1981 |
| JP | 57-49877 | 3/1982 |
| JP | 5-7669 | 1/1993 |
| JP | 2629612 | 4/1997 |

OTHER PUBLICATIONS

Tadashi Kobayashi, et al., "Precision Distance Measuring Equipment (DME/P) Transponder", NEC Research & Development, No. 90, XP-000046941, Jul. 1, 1988, pp. 106-116.

* cited by examiner

*Primary Examiner*—John B Sotomayor
(74) *Attorney, Agent, or Firm*—Oblon, Spivak, McClelland, Maier & Neustadt, L.L.P.

(57) ABSTRACT

A transmitting apparatus comprises a generator for generating a pulse signal having a waveform approximated to the Gaussian error function at a prescribed timing, a transmitter for power-amplifying a pulse signal generated by the generator, and transmitting the amplified pulse signal, an evaluator for extracting a pulse waveform part from the power-amplified pulse signal, comparing the extracted pulse waveform part with an ideal waveform so as to obtain an error amount between the pulse waveform part and the ideal waveform, and evaluating whether or not the error amount is within a prescribed error range, and a controller for causing the generator to subject the waveform of the pulse signal to correction in such a manner that the error amount becomes smaller each time an evaluation result of the evaluator is that the error amount is out of the prescribed error range.

3 Claims, 2 Drawing Sheets

PULSE SIGNAL TRANSMITTING APPARATUS, METHOD OF ADJUSTING WAVEFORM OF THE SAME, AND DME GROUND STATION APPARATUS

CROSS-REFERENCE TO RELATED APPLICATIONS

This application is based upon and claims the benefit of priority from prior Japanese Patent Application No. 2007-024555, filed Feb. 2, 2007, the entire contents of which are incorporated herein by reference.

BACKGROUND OF THE INVENTION

1. Field of the Invention

The present invention relates to a pulse signal transmitting apparatus used in a ground station apparatus of distance measuring equipment (DME) which is one of aeronautical radio navigation aids, and more particularly, to a waveform adjusting technique for removing a distortion occurring in a pulse waveform of a transmission signal.

2. Description of the Related Art

As is generally known, DME receives an interrogation pulse signal transmitted from an aircraft in a ground station, detects a temporal position thereof, and transmits a response pulse within a predetermined period, thereby causing the aircraft to recognize distance information (see, for example, Japanese Patent No. 2629612). Here, a frequency of a transmission/reception channel is assigned to the DME in advance, and a waveform of a modulation pulse to be used is approximated to the Gaussian error function so that a bandwidth of the pulse spectrum can be made narrow. Further, a procedure of making a timing reference point for detecting a position (hereinafter referred to as a pulse position) of a pulse on the time axis a half-amplitude point of the pulse rising edge is employed. Under such circumstances, in the DME, detection accuracy of a pulse position directly exerts a great influence on the system accuracy.

Here, in the ground station apparatus of the DME, the transmission pulse signal is amplified and output by a high-output power transistor at the output stage. For this reason, the output waveform of the transmission pulse signal obtained at the output stage is inevitably distorted by the characteristics of the amplifier circuit including the power transistor. In the DME, a rise time, fall time, pulse width, and the like of a waveform of a transmitted pulse are prescribed, and when a transmission pulse waveform does not satisfy the prescription, the waveform must be adjusted so as to satisfy the prescription without fail.

It is impossible to forecast how the waveform is distorted as compared with the input waveform because the distortion depends on the characteristics of the amplifier circuit including the power transistor. For this reason, in the prior art technique, adjustment has been performed by slowly changing an input waveform while observing an output waveform, and hence a great deal of labor has been required in the adjustment work.

Incidentally, in Japanese Patent No. 2629612 described above, although automatic gain control of the DME is described, automatic waveform shaping is not described.

As described above, in the DME ground station apparatus, when the transmission pulse signal is amplified, an unpredictable distortion occurs in the signal, and hence adjustment has been performed by slowly changing an input waveform while observing an output waveform, and a great deal of labor has been required in the adjustment work.

BRIEF SUMMARY OF THE INVENTION

An object of the present invention is to provide a pulse signal transmitting apparatus, a method of adjusting a waveform thereof, and a DME ground station apparatus capable of automatically adjusting a pulse waveform of a transmission pulse signal so as to allow the pulse waveform of the transmission pulse signal to satisfy a prescribed range.

In first aspect of the present invention, there is provided a pulse signal transmitting apparatus comprising: a signal generator for generating a pulse signal having a waveform approximated to the Gaussian error function at a prescribed timing; a transmitter for power-amplifying a pulse signal generated by the signal generator, and transmitting the amplified pulse signal; an evaluator for extracting a pulse waveform part from the power-amplified pulse signal, comparing the pulse waveform part with an ideal waveform so as to obtain an error amount between the pulse waveform part and the ideal waveform, and evaluating whether or not the error amount is within a prescribed error range; and a waveform controller for causing the signal generator to subject the waveform of the pulse signal to correction in such a manner that the error amount becomes smaller each time an evaluation result of the evaluator is that the error amount is out of the prescribed error range.

In second aspect of the present invention, there is provided a method of adjusting a waveform of a pulse signal transmitting apparatus used in a pulse signal transmitting apparatus for generating a pulse signal having a waveform approximated to the Gaussian error function at a predetermined timing, and power-amplifying and transmitting the generated pulse signal, comprising: extracting a pulse waveform part from the power-amplified pulse signal; comparing the extracted pulse waveform part with an ideal waveform so as to obtain an error amount between the pulse waveform part and the ideal waveform, and evaluating whether or not the error amount is within a prescribed error range; and subjecting the waveform of the pulse signal to correction in such a manner that the error amount becomes smaller each time an evaluation result is that the error amount is out of the prescribed error range.

In third aspect of the present invention, there is provided a distance measuring equipment (DME) ground station apparatus for providing distance information by receiving an interrogation signal from an aircraft and transmitting a transmission pulse signal a waveform of which is prescribed at a predetermined timing, comprising: a receiver for receiving the interrogation signal; a signal generator for generating a pulse signal having a waveform approximated to the Gaussian error function at a timing after an elapse of a predetermined time from a reception timing of the receiver; a transmitter for power-amplifying a pulse signal generated by the signal generator, and transmitting the amplified pulse signal; an evaluator for extracting a pulse waveform part from the power-amplified pulse signal, comparing the pulse waveform part with an ideal waveform so as to obtain an error amount between the pulse waveform part and the ideal waveform, and evaluating whether or not the error amount is within a prescribed error range; and a waveform controller for causing the signal generator to subject the waveform of the pulse signal to correction in such a manner that the error amount becomes smaller each time an evaluation result of the evaluator is that the error amount is out of the prescribed error range.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the present invention will be described below with reference to the accompanying drawings.

Figure 1:
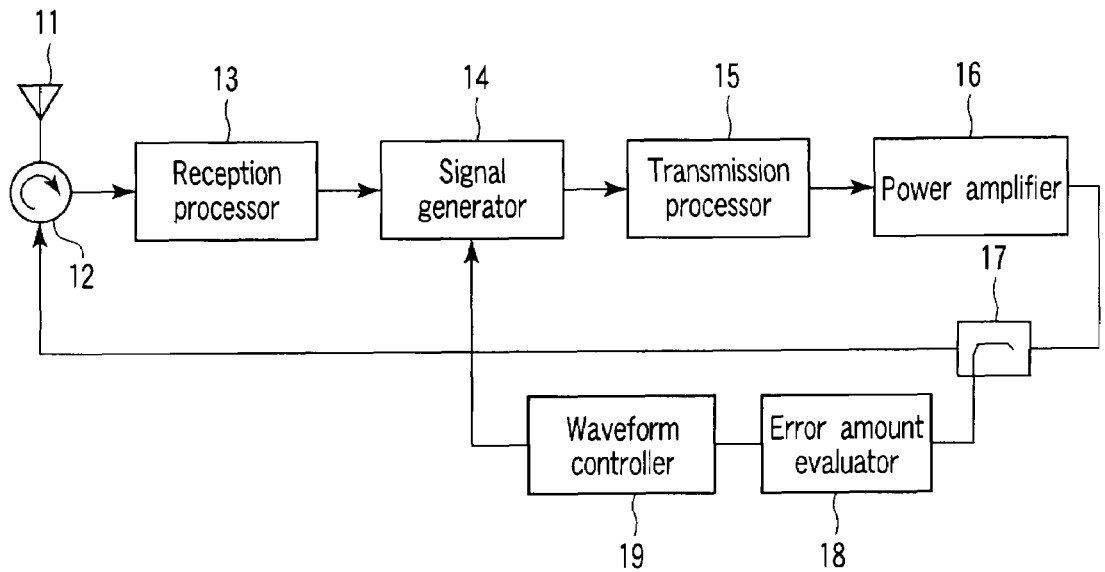
FIG. 1 is a block diagram showing a configuration of an embodiment of a DME ground station apparatus according to the present invention.

FIG. 1 is a block diagram showing a configuration of a DME ground station apparatus according to the present invention. In FIG. 1, a pulse signal (interrogator) from an aircraft received by a bidirectional antenna 11 is received and demodulated by a reception processor 13 through a circulator 12, and a rise timing of a pulse is detected. A signal generator 14 generates a pulse signal of a Gaussian waveform after an elapse of a predetermined period from the pulse rise timing detected by the reception processor 13. The pulse signal generated herein is subjected to predetermined modulation processing by a transmission processor 15 so as to be converted into a signal of a transmission frequency, and power-amplified by a power amplifier 16 so as to be transmitted to the space from the bidirectional antenna 11 through a coupler 17 and the circulator 12.

The coupler 17 described above is used to partly branch the transmission signal for use in transmission waveform monitoring, and the branched signal is sent to an error amount evaluator 18. The error amount evaluator 18 converts the input signal into a digital signal, extracts a pulse waveform part from the input signal, compares the extracted pulse waveform part with an ideal waveform, and samples an error amount between the two waveforms so as to evaluate whether or not the error amount is within a prescribed error range. When the error amount is not within the prescribed error range, the sampled error amount is sent to a waveform controller 19. The waveform controller 19 subjects the pulse waveform generated by the signal generator 14 on the basis of the sampling result of the pulse waveform error amount to correction of increasing or decreasing, and appropriately controls the correction in accordance with a change in the sampling error amount, thereby approximating the waveform of the output pulse signal to the ideal waveform. Further, the waveform controller 19 finally determines a waveform pattern by which an output pulse signal that can be within the prescribed error range is obtained.

Figure 2A:
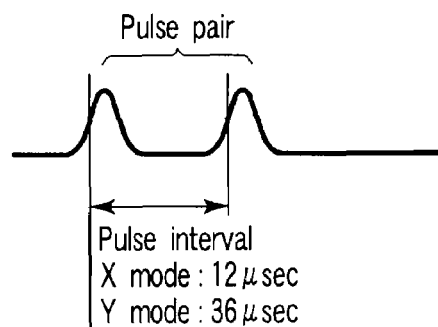
FIGS. 2A and 2B are timing waveform charts respectively showing a relationship between a reception signal and a transmission signal in the DME ground station apparatus shown in FIG. 1.
Figure 2B:
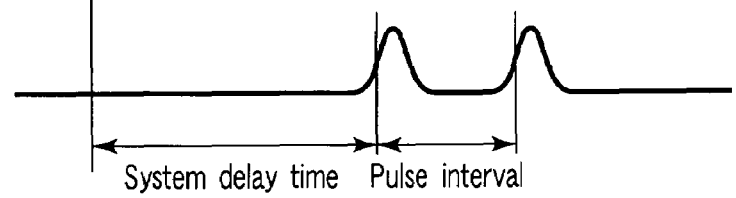
Figure 3:
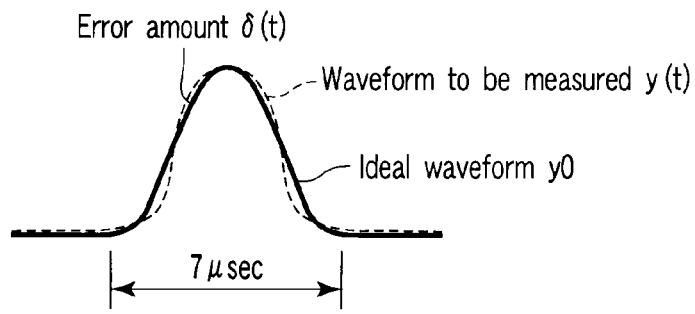
FIG. 3 is a waveform chart showing a state where a pulse waveform to be measured and an ideal pulse waveform are compared with each other in an error amount evaluator shown in FIG. 1.

In the above configuration, utilization processing thereof will be described below with reference to FIGS. 2 to 4. FIGS. 2A and 2B are timing waveform charts respectively showing a relationship between a reception signal and a transmission signal in the DME ground station apparatus. It is assumed here that a reception signal of a pulse pair P1 and P2 is obtained as shown in FIG. 2A. The reception processor 13 receives and demodulates a pulse signal of a Gaussian waveform, and detects a rise of each of the pulse signals P1 and P2 at a half-amplitude position. It is prescribed that an interval between the pulse pair P1 and P2 is 12 μsec in the X mode, and 36 μsec in the Y mode. The reception processor 13 determines whether the X mode is required or the Y mode is required by measuring the interval between the detection timings of both the pulses P1 and P2.

The signal generator 14 provides a waveform signal of a pulse pair P3 and P4 having a predetermined pulse interval (12 μsec in the X mode, and 30 μsec in the Y mode) after an elapse of a prescribed system delay time (50 μsec in the X mode, and 56 μsec in the Y mode) based on the determined mode received from the reception processor 13 from the detection timing of the first pulse P1 as shown in FIG. 2B. This waveform signal is modulated by the transmission processor 15 and converted into a signal of the transmission frequency, and is power-amplified by the power amplifier 16 so as to be transmitted to the space from the bidirectional antenna 11 through the coupler 17 and the circulator 12.

Figure 4:
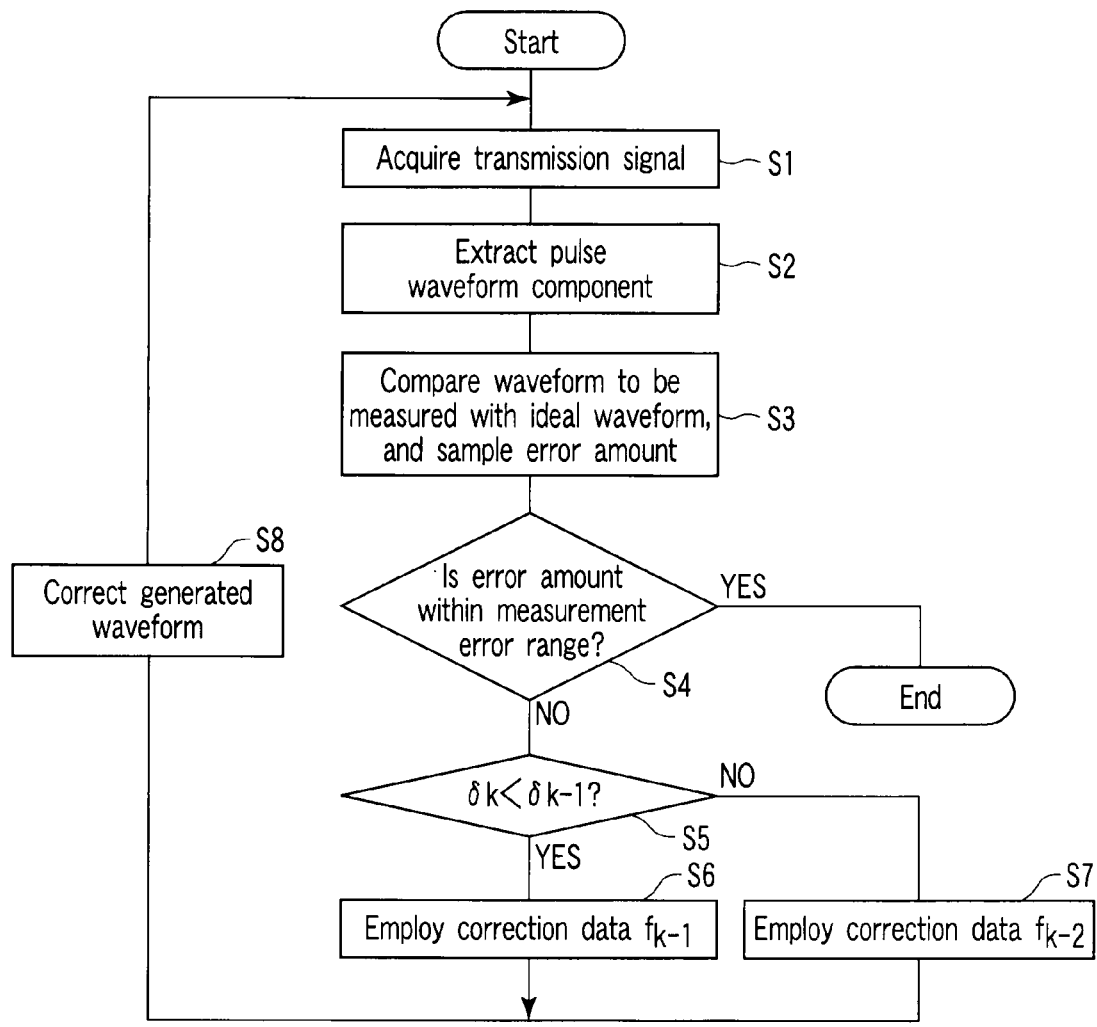
FIG. 4 is a flowchart showing procedures for automatic adjustment work of waveform normalization in the apparatus shown in FIG. 1.

As for generation of the above transmission signal, automatic adjusting processing of waveform normalization is performed as shown in FIG. 4. First, the error amount evaluator 18 acquires the transmission signal partly branched by the coupler 17 for use in transmission waveform monitoring (step S1), extracts a pulse waveform part from the input signal (step S2), compares the extracted pulse waveform part as a waveform to be measured with an ideal waveform, and samples an error amount between the two waveforms (step S3) so as to evaluate whether or not the error amount is within a prescribed error range (step S4).

Here, assuming that the waveform to be measured is y(t), ideal waveform is y0, error amount is δ(t), and a threshold of the prescribed error range is ϵ, the evaluation is expressed by the following formula.

$$y_0 = \sin^2\left(\pi \frac{t \, \mu\text{sec}}{7 \, \mu\text{sec}}\right)$$

$$\delta(t) = \sum_{n=1}^{N} \{y(t_n) - y_0(t_n)\}^2 < \varepsilon$$

It is further assumed here that an error amount at the kth (this time) measurement time is $\delta_k$, and an error amount at the (k-1)th (preceding time) measurement time is $\delta_{k-1}$.

When the error amount is within the prescribed error range ϵ, it is determined that the pulse waveform of the transmission signal is proper, and the adjusting processing is terminated. When the error amount is not within the prescribed error range ϵ, the error amount $\delta^k$ Of this time is compared with the error amount $\delta_{k-1}$ of the preceding time (step S5). When the comparison result is $\delta_k < \delta_{k-1}$ correction data $f_{k-1}$ for the pulse waveform of this time is employed (step S6), and when the comparison result is $\delta_k \geq \delta_{k-1}$ the correction data $f_{k-1}$ for the pulse waveform of this time is discarded, and correction data $f_{k-2}$ for the pulse waveform of the preceding time is employed (step S7). The employed correction data is registered as an index of correction data $f_k$ for the pulse waveform of the next time. The generated waveform of the signal generator 14 is again subjected to correction by using the correction data $f_k$ (step S8), a result of the modulation processing performed by the transmission processor 15, and a result of the power amplification performed by the power amplifier 16 are acquired, and the processing is executed again from step S1. The above processing is repeated, and correction is performed by using a genetic algorithm, thereby causing the error amount to be finally within the prescribed error range $\epsilon$.

Accordingly, the DME ground station apparatus having the configuration described above can automatically perform pulse waveform shaping that has been manually adjusted in the prior art technique, and can dramatically reduce the labor of the adjustment work.

Incidentally, the present invention is not limited to the above-mentioned embodiment as it is, and the constituent elements can be modified in the implementation stage within the range not deviating from the gist of the invention so as to be concretized. Further, by appropriately combining a plurality of constituent elements disclosed in the embodiment described above with each other, various inventions can be formed. For example, some constituent elements may be deleted from all the constituent elements shown in the embodiment. Further, constituent elements of different embodiments may be appropriately combined with each other.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A pulse signal transmitting apparatus comprising:
    a signal generator for generating a pulse signal having a waveform approximated to the Gaussian error function at a prescribed timing;
    a transmitter for power-amplifying a pulse signal generated by the signal generator, and transmitting the amplified pulse signal;
    an evaluator for extracting a pulse waveform part from the power-amplified pulse signal, comparing the pulse waveform part with an ideal waveform so as to obtain an error amount between the pulse waveform part and the ideal waveform, and evaluating whether or not the error amount is within a prescribed error range; and
    a waveform controller for causing the signal generator to subject the waveform of the pulse signal to correction in such a manner that the error amount becomes smaller each time an evaluation result of the evaluator is that the error amount is out of the prescribed error range.

2. A method of adjusting a waveform of a pulse signal transmitting apparatus used in a pulse signal transmitting apparatus for generating a pulse signal having a waveform approximated to the Gaussian error function at a predetermined timing, and power-amplifying and transmitting the generated pulse signal, comprising:
    extracting a pulse waveform part from the power-amplified pulse signal;
    comparing the extracted pulse waveform part with an ideal waveform so as to obtain an error amount between the pulse waveform part and the ideal waveform, and evaluating whether or not the error amount is within a prescribed error range; and
    subjecting the waveform of the pulse signal to correction in such a manner that the error amount becomes smaller each time an evaluation result is that the error amount is out of the prescribed error range.

3. A distance measuring equipment (DME) ground station apparatus for providing distance information by receiving an interrogation signal from an aircraft and transmitting a transmission pulse signal a waveform of which is prescribed at a predetermined timing, comprising:
    a receiver for receiving the interrogation signal;
    a signal generator for generating a pulse signal having a waveform approximated to the Gaussian error function at a timing after an elapse of a predetermined time from a reception timing of the receiver;
    a transmitter for power-amplifying a pulse signal generated by the signal generator, and transmitting the amplified pulse signal;
    an evaluator for extracting a pulse waveform part from the power-amplified pulse signal, comparing the pulse waveform part with an ideal waveform so as to obtain an error amount between the pulse waveform part and the ideal waveform, and evaluating whether or not the error amount is within a prescribed error range; and
    a waveform controller for causing the signal generator to subject the waveform of the pulse signal to correction in such a manner that the error amount becomes smaller each time an evaluation result of the evaluator is that the error amount is out of the prescribed error range.

* * * * *